(12) United States Patent
Lin

(10) Patent No.: US 9,969,212 B2
(45) Date of Patent: May 15, 2018

(54) RESISTANCE FORCE CONTROL STRUCTURE OF DRIVEN PULLEY DEVICE

(71) Applicants: Long Yue Cast-Press Co., Ltd., New Taipei (TW); Tung-Yi Lin, New Taipei (TW)

(72) Inventor: Tung-Yi Lin, New Taipei (TW)

(73) Assignees: LONG YUE CAST-PRESS CO., LTD., New Taipei (TW); Tung-Yi Lin, New Taipei (TW)

( * ) Notice: Subject to any disclaimer, the term of this patent is extended or adjusted under 35 U.S.C. 154(b) by 157 days.

(21) Appl. No.: 15/187,028

(22) Filed: Jun. 20, 2016

(65) Prior Publication Data
US 2017/0361649 A1 Dec. 21, 2017

(51) Int. Cl.
| | |
|---|---|
| B60B 27/02 | (2006.01) |
| B60B 21/08 | (2006.01) |
| B60B 3/08 | (2006.01) |
| B60B 25/00 | (2006.01) |
| B60T 1/06 | (2006.01) |
| A61H 3/00 | (2006.01) |

(52) U.S. Cl.
CPC ............... *B60B 21/08* (2013.01); *A61H 3/00* (2013.01); *B60B 3/085* (2013.01); *B60B 25/00* (2013.01); *B60B 27/02* (2013.01); *B60T 1/067* (2013.01)

(58) Field of Classification Search
CPC .......... B60B 21/08; B60B 27/02; B60T 1/067
See application file for complete search history.

(56) References Cited

U.S. PATENT DOCUMENTS

| | | | | |
|---|---|---|---|---|
| 9,133,893 | B2 * | 9/2015 | Tilly | F01P 5/043 |
| 9,284,994 | B2 * | 3/2016 | Williams | B60K 25/02 |
| 2010/0122882 | A1 * | 5/2010 | Komorowski | F16D 27/105 |
| | | | | 192/35 |
| 2015/0184702 | A1 * | 7/2015 | Schmidt | F16D 35/00 |
| | | | | 192/58.8 |

\* cited by examiner

*Primary Examiner* — Ramya P Burgess
*Assistant Examiner* — Lillian T Nguyen
(74) *Attorney, Agent, or Firm* — Muncy, Geissler, Olds & Lowe, P.C.

(57) ABSTRACT

The present invention discloses a resistance force control structure of driven pulley device, which is pivot mounted on a wheel of a driven pulley device, and primarily uses damping oil or a magnetic force to achieve a resistance effect. The magnetic force portion can also be added to a gear structure to present another configuration of a resistance force control structure to achieve change in magnetic force to increase the stabilizing effect of a wheeled frame. Moreover, an adjustable mechanism enables the user to control changes in the height of the damping oil level or magnetic force strength to control the rotational speed of a wheel.

8 Claims, 19 Drawing Sheets

RESISTANCE FORCE CONTROL STRUCTURE OF DRIVEN PULLEY DEVICE

BACKGROUND OF THE INVENTION (a) Field of the Invention

The present invention relates to a resistance force control structure of driven pulley device, and more particularly to a resistance force control structure of driven pulley device that enables adjusting the speed limit of a wheel.

(b) Description of the Prior Art

In general, patients who undergo surgical treatment for pathological changes in their spine and lower limbs still find their ability to move around difficult. Hence, the patients still need to use a support frame to assist them in getting about. However, when the rehabilitant wants to move about, they need to continuously lift the support frame to move the support frame forward with every step they make, which is clearly neither practical nor convenient.

Driven pulley devices in the current market can be roughly divided into fixed mobility aids and wheeled driven pulley devices. The majority of users using such devices are patients suffering from weakening of the lower limb muscles, physically challenged senior citizens, stroke victims, or persons inflicted with infantile paralysis, all of whom lack the ability to move around independently, and have poor balance ability.

Driven pulley devices of the prior art are all assembled using a simple support frame for use by the patient. And for the patient with feet disabilities and unable to stand, then they can use a wheelchair (mobile aid) as a substitute.

Using a fixed driven pulley device can relieve the patient's lower limbs when standing. However, when moving, the patient must lift up the driven pulley device him/herself to move forward before stepping forward.

Although the aforementioned driven pulley devices of the prior art provide the function to aid mobility, however, they still have the following shortcoming: when the wheel speed is excessively fast, because a deceleration system is not installed in the driven pulley devices of the prior art, thus, the patient is frequently put in danger.

Currently, a brake system provided in driven pulley devices of the prior art usually consists of a simple brake to achieve a deceleration effect, which easily results in disequilibrium, causing the frame of the mobile aid to lean and topple over.

Hence, it can be seen that many shortcomings still exist in the aforementioned driven pulley devices of the prior, and in reality are not good designs that are in need of urgent improvement.

In light of the above shortcomings existent in the driven pulley devices of the prior art, the inventor of the present invention has actively researched innovative improvements, and through painstaking efforts and careful study over many years finally succeeded in developing a resistance force control structure of driven pulley device of the present invention.

SUMMARY OF THE INVENTION

The main object of the present invention lies in providing a method using damping oil or magnetic force as a resistance force control structure to limit the rotational speed of a driven pulley device.

A second object of the present invention lies in providing a method to control the displacement of first magnetic elements within a movable member to vary the magnetic force of second magnetic elements within a fixing member therebetween to control the speed limit of a wheel. Moreover, an adjustable mechanism is used to control changes in the height of damping oil level to control the rotational speed of the wheel.

In order to achieve the aforementioned objects, a resistance force control structure of driven pulley device of the present invention is pivot mounted on a wheel of a driven pulley device, and comprises: a wheel housing, a holding space is formed within the wheel housing, a fixing member, damping oil, and a wheel shaft are disposed in the holding space, the fixing member is disposed in the holding space of the wheel housing, wherein one end of the wheel shaft penetrates the fixing member, and a fixing insert pin is used to penetrate and rigidly fix the fixing member; a wheel outer cover, which is disposed on the wheel housing and covers the holding space to form a sealed space, the interior of the sealed space is filled with the damping oil, wherein the wheel outer cover enables the other end of the wheel shaft to penetrate therethrough. In order to control the wheel speed and thereby increase the stabilizing effect of a wheeled frame, an adjustable mechanism and a movable member can be added to the structure. The adjustable mechanism penetrates the movable member and the wheel housing and connects to the wheel shaft, wherein the adjustable mechanism controls displacement of the movable member within the holding space to enable adjusting the height of the damping oil level. The structure of the present invention is further provided with a ventilation structure, which is disposed on the outer side of the wheel housing or the outer side of the wheel outer cover to enable entering and expelling of air into the sealed space.

Another embodiment of the resistance force control structure of driven pulley device of the present invention uses magnetic force as a substitute for the damping oil. The structure is still pivot mounted on the wheel of a driven pulley device, and comprises: the wheel housing, the holding space is formed within the wheel housing, the movable member, the fixing member, first magnetic elements, second magnetic elements, and the wheel shaft are disposed within the holding space, wherein the first magnetic elements and the second magnetic elements are disposed on the movable member and the fixing member respectively, one end of the wheel shaft penetrates the fixing member, and the fixing insert pin is used to penetrate and rigidly fix the fixing member; the wheel outer cover, which is disposed on the wheel housing and covers the holding space to form a sealed space, wherein the wheel outer cover enables the other end of the wheel shaft to penetrate therethrough. In order to achieve a stabilising effect of the wheeled frame, the adjustable mechanism is further added to control the rotational speed of the wheel. The adjustable mechanism penetrates the movable member and the wheel shaft and connects to the wheel shaft, wherein the adjustable mechanism controls displacement of the movable member within the holding space.

In order to provide the magnets within the movable member with an autorotation function to enable change in magnetic force and increase the stabilizing effect of the wheeled frame, the resistance force control structure of driven pulley device of the present invention is pivot mounted on a wheel of the driven pulley device, and comprises: the wheel housing, the holding space is formed within the wheel housing, the movable member, the fixing member, the first magnetic elements, the second magnetic elements, a big gear wheel, small gear wheels, and the wheel shaft are disposed within the holding space, wherein the first magnetic elements and the second magnetic elements are disposed on the movable member and the fixing member respectively, the first magnetic elements are covered within the movable member and further extend to the small gear wheels. After the big gear wheel is fixed to the wheel shaft, then the big gear wheel moves in unison with the wheel. The small gear wheels mutually connect with the big gear wheel, wherein the number of small gear wheels is one or more than one. The gear mechanism is able to assist in providing the magnets within the movable member with an autorotation function to enable change in magnetic force and increase the stabilizing effect of the wheeled frame. One end of the wheel shaft penetrates the fixing member and the big gear wheel, and the fixing insert pin is used to penetrate and rigidly fix the fixing member. The structure further comprises a wheel outer cover, which is disposed on the wheel housing and covers the holding space to form a sealed space, wherein the wheel outer cover enables the other end of the wheel shaft to penetrate therethrough. The adjustable mechanism can be further added to the structure, wherein the adjustable mechanism penetrates the fixing member and the wheel shaft and connects to the wheel shaft, wherein the adjustable mechanism controls displacement of the fixing member within the holding space, thereby further achieving the effectiveness of controlling resistance.

According to the aforementioned embodiment of the present invention, the movable member is also internally configured with one or more than one holding space to dispose the first magnetic elements. The first magnetic elements are magnets or magnetic response objects, and the number thereof can be one or more than one.

As for the fixing member, the interior thereof can be provided with one or more than one holding spaces to enable the second magnetic elements to be disposed therein. The second magnetic elements are magnets or magnetic response objects, and the number thereof can be one or more than one.

And the adjustable mechanism is connected to the wheel shaft and the wheel housing.

Accordingly, when the wheel rotates, the magnets or the magnetic response objects of the movable member are able to rotate synchronously with the wheel. Because of the magnetic force produced between the magnets or the magnetic response objects of the movable member and the magnets or the magnetic response objects of the fixing member, a resistance force is applied to the wheel, which further controls the rotational speed of the wheel, at the same time, the strength of the magnetic force is related to the contact area or distance between the magnets or the magnetic response objects on the movable member and the magnets or the magnetic response objects on the fixing member. Hence, the wheel speed can be controlled by making adjustments to the movable member or the displacement amount of the fixing member through the adjustable mechanism to control magnetic force area or distance.

Another object of the present invention lies in an embodiment of the structure of the present invention wherein the movable member and the fixing member can achieve the same effectiveness through a reversal design thereof.

To enable a further understanding of said objectives and the technological methods of the invention herein, a brief description of the drawings is provided below followed by a detailed description of the preferred embodiments.

BRIEF DESCRIPTION OF THE DRAWINGS

FIG. 2-A is an elevational schematic view of the damping mechanism of the resistance adjustable control mechanism of the present invention.

FIG. 3-A is an exploded structural schematic view of the damping mechanism of the resistance adjustable control mechanism of the present invention.

FIG. 4-A is a cross-sectional structural schematic view of the damping mechanism of the resistance adjustable control mechanism of the present invention.

FIG. 5-A is an elevational schematic view of the magnetic resistance mechanism of the resistance adjustable control mechanism of the present invention.

FIG. 6-A is an exploded structural schematic view of the magnetic resistance mechanism of the resistance adjustable control mechanism of the present invention.

FIG. 7-A is a cross-sectional structural schematic view of the magnetic resistance mechanism of the resistance adjustable control mechanism of the present invention.

FIG. 8-A is an elevational schematic view of the gear wheel resistance mechanism of the resistance adjustable control mechanism of the driven pulley device of the present invention.

FIG. 9-A is an exploded structural schematic view of the gear wheel resistance mechanism of the resistance adjustable control mechanism of the driven pulley device of the present invention.

FIG. 10-A is a cross-sectional structural schematic view of the gear wheel resistance mechanism of the resistance adjustable control mechanism of the driven pulley device of the present invention.

DETAILED DESCRIPTION OF THE PREFERRED EMBODIMENTS

The above-mentioned and objects, features and advantages of the present invention are clear and easily understood, and the detailed description below, together with the accompanying drawings, discloses the preferred embodiments of the present invention.

Figure 1:
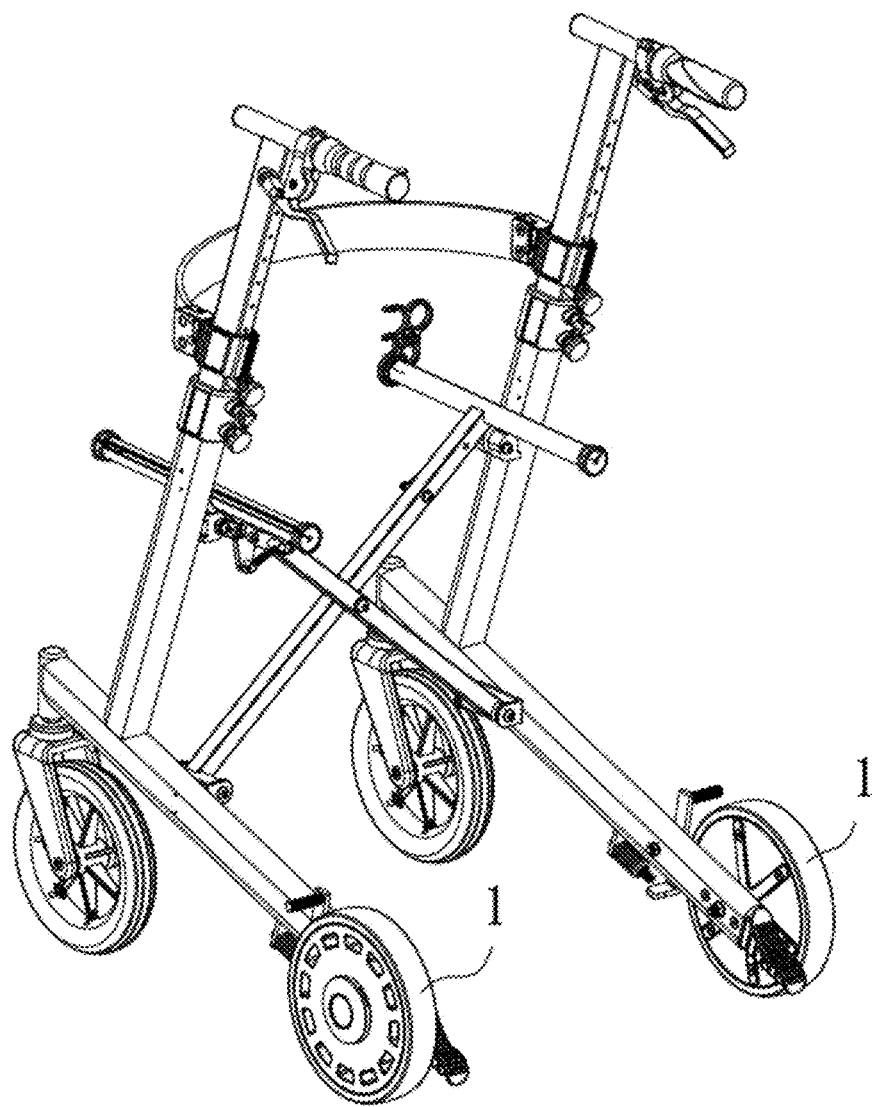
FIG. 1 is a structural schematic view of the present invention installed on a wheeled frame.

Referring to FIG. 1, which shows a structural schematic view of the present invention installed on a wheeled frame, wherein the structure of the present structure is installed within wheel housings of the wheeled frame.

Figure 2:
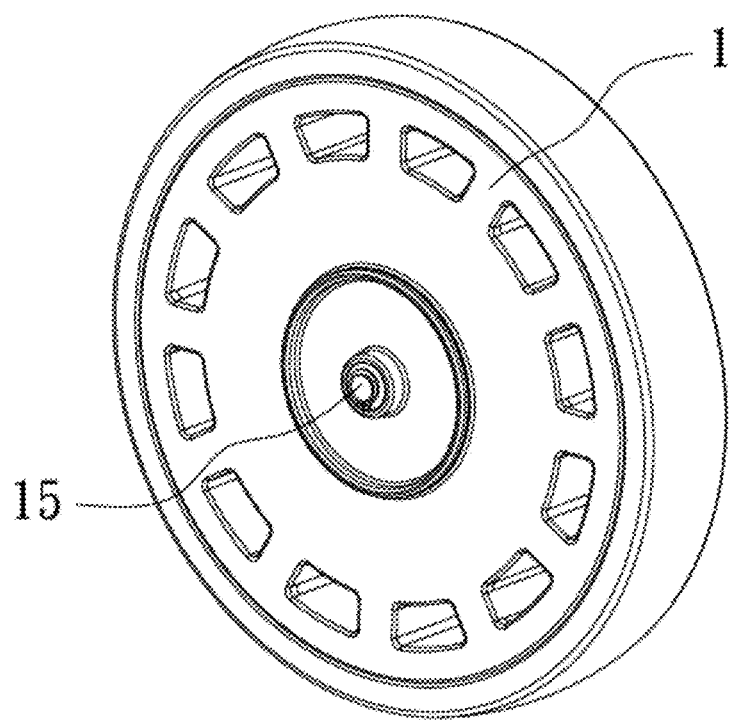
FIG. 2 is an elevational schematic view of a damping mechanism of the present invention.
Figure 2A:
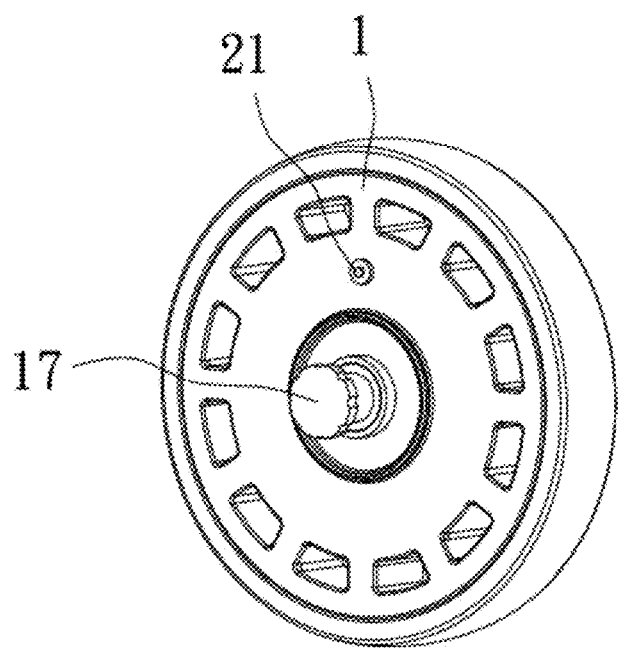
Figure 3:
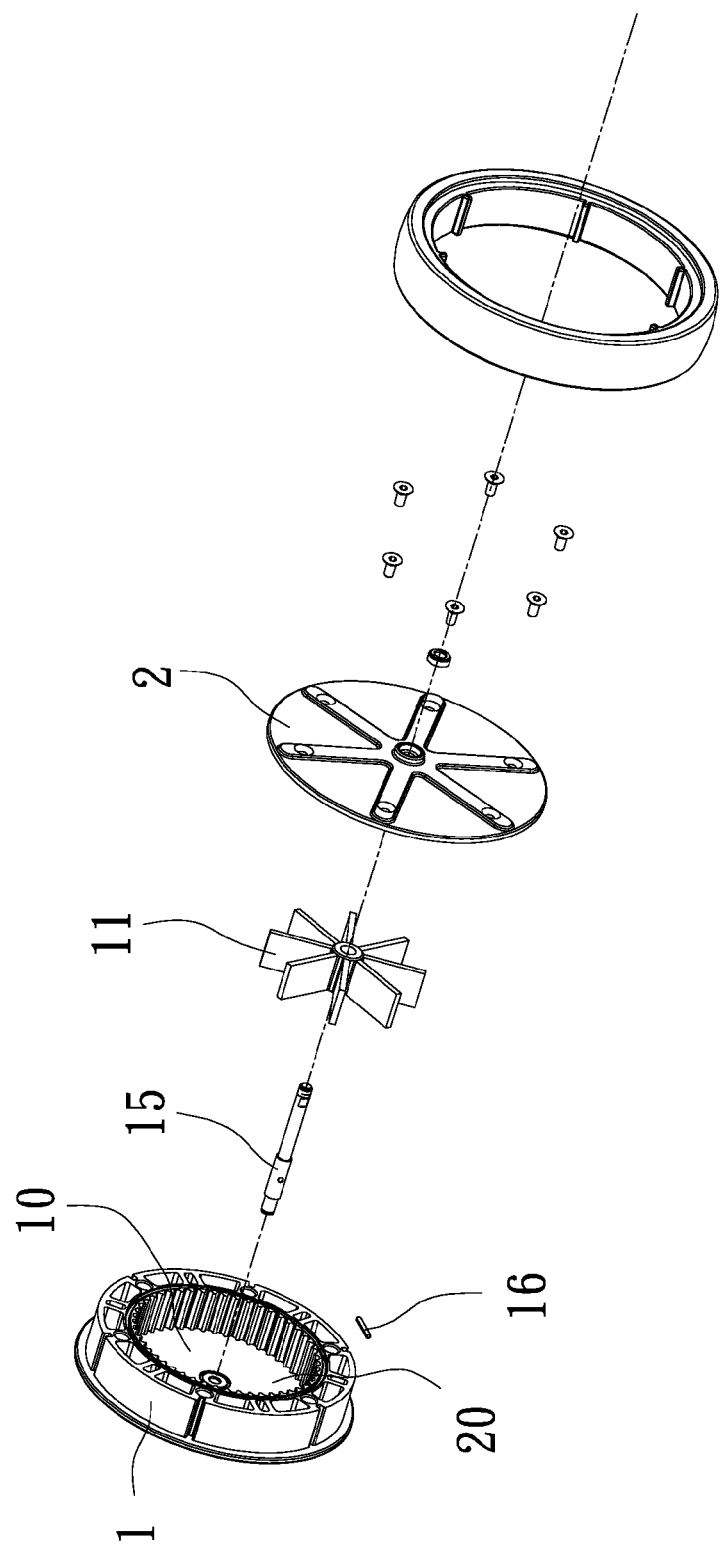
FIG. 3 is an exploded structural schematic view of the damping mechanism of the present invention.
Figure 3A:
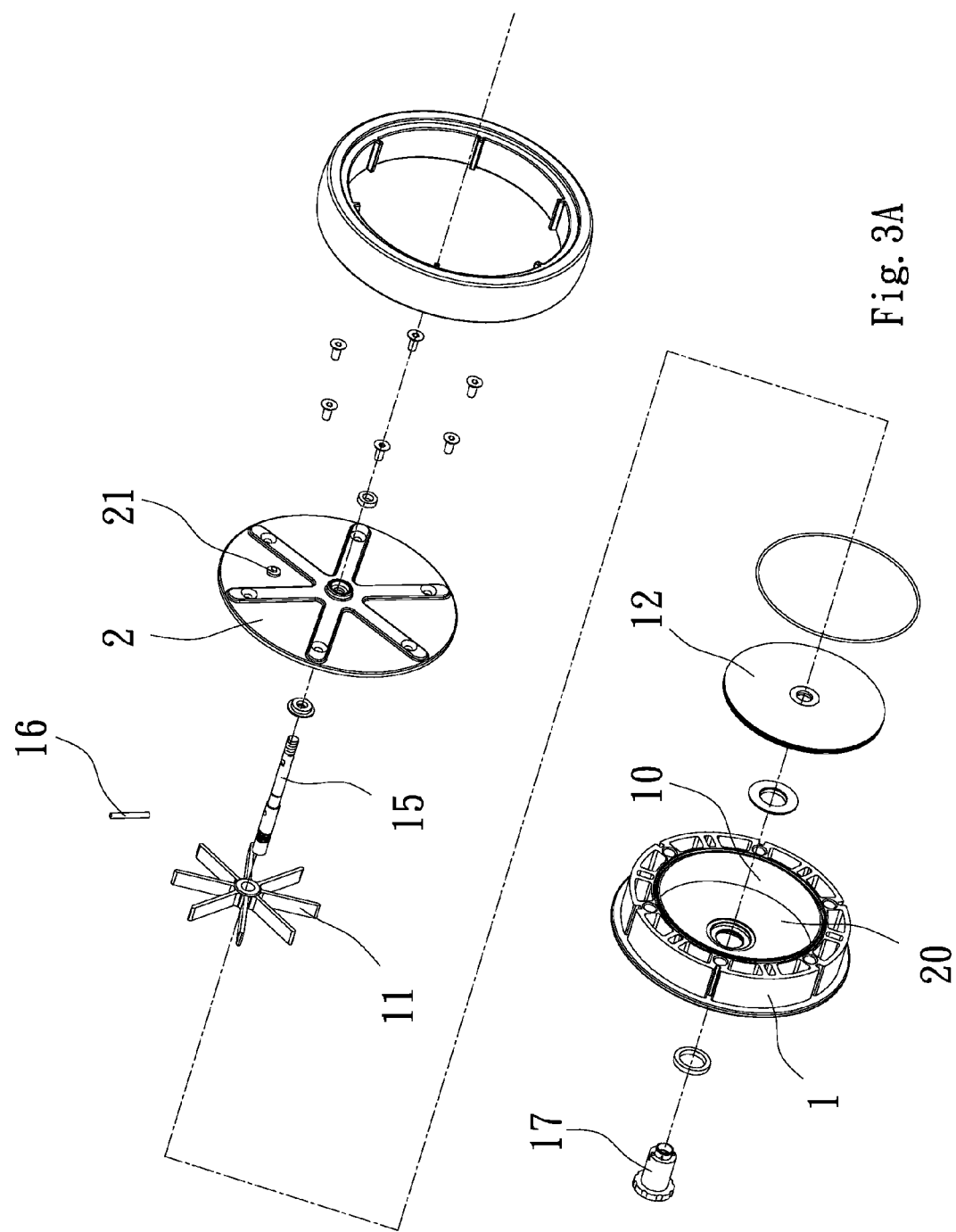
Figure 4:
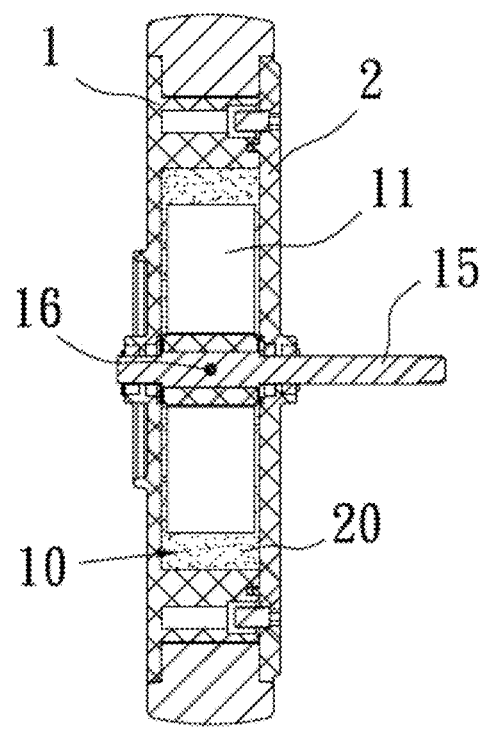
FIG. 4 is a cross-sectional structural schematic view of the damping mechanism of the present invention.
Figure 4A:
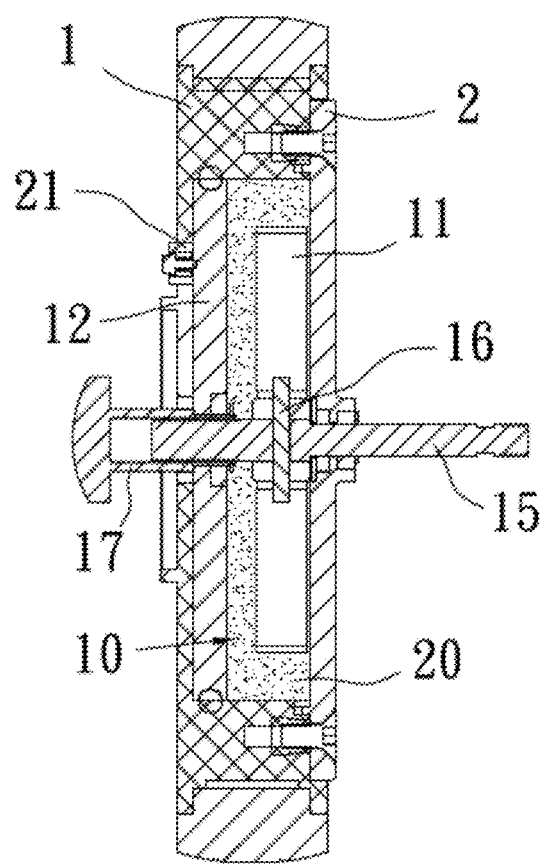

Referring to FIG. 2, FIG. 3 and FIG. 4, which show an elevational schematic view of a damping mechanism, an exploded structural schematic view of the damping mechanism, and a cross-sectional structural schematic view of the damping mechanism of the present invention, respectively. A fixing member 11, damping oil 20, and a wheel shaft 15 are disposed in a holding space 10 provided within a wheel housing 1, wherein one end of the wheel shaft 15 penetrates the fixing member 11, and a fixing insert pin 16 is used to penetrate and rigidly fix the fixing member 11. A wheel outer cover 2 is disposed on the wheel housing 1 to cover the holding space 10 and form a sealed space, and the interior of the sealed space is filled with the damping oil 20. The other end of the wheel shaft 15 passes through the wheel outer cover 2. Furthermore, referring to FIG. 2-A, FIG. 3-A and FIG. 4-A, in order to control the speed of the wheeled frame and increase the stabilizing effect thereof, an adjustable mechanism 17 and a movable member 12 are additionally installed. The adjustable mechanism 17 fittingly penetrates the movable member 12 and the wheel housing 1, and then connects to the wheel shaft 15, wherein the adjustable mechanism 17 controls displacement of the movable member 12 within the holding space 10 to adjust the height of the damping oil level. A ventilation structure 21 is further disposed on the wheel housing 1 or the wheel outer cover 2, and the ventilation structure 21 is used for the effective entering and expelling of air within the sealed space.

From the aforementioned it can be understood that smooth displacement of the movable member 12 is achieved by using the adjustable mechanism 17 to control movement thereof and using the ventilation structure 21 to achieve effective entering and expelling of air inside the sealed space within the wheel housing 1. Accordingly, the height of the damping oil level can be controlled, the area of the damping oil 20 the fixing member 11 is in contact with can be changed, and control of the rotational resistance of the wheel set can be achieved.

In addition, the wheel outer cover 2 needs to cover the outer side of the holding space 10 of the wheel housing 1 to enable sealing the holding space 10, primary reason being to prevent the damping oil 20 from being affected by external factors and causing serious deterioration thereof. In the aforementioned embodiments, apart from using the adjustable mechanism 17 to vary the height of the damping oil 20 level to control the wheel speed through the viscosity force of the damping oil 20, which will not produce mechanical noise, controlling the height of the damping oil 20 level through the adjustable mechanism 17 can also be used to change the acting surface area of the damping oil 20 acting on the fixing member 11, thus further achieving the effectiveness of controlling resistance.

Figure 5:
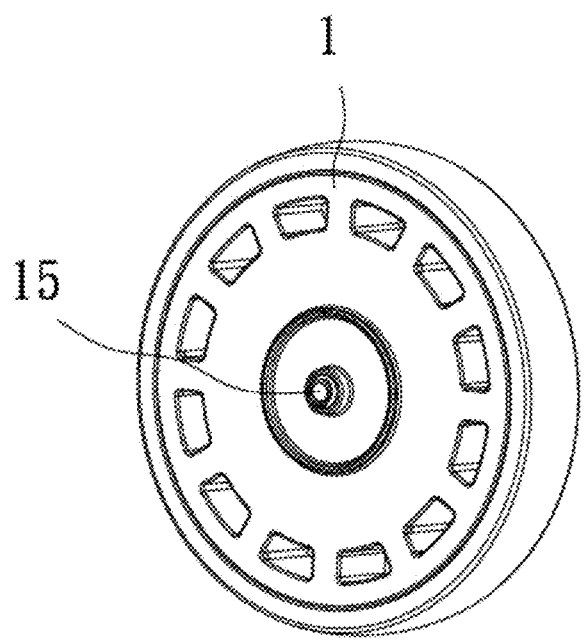
FIG. 5 is an elevational schematic view of a magnetic resistance mechanism of the present invention.
Figure 5A:
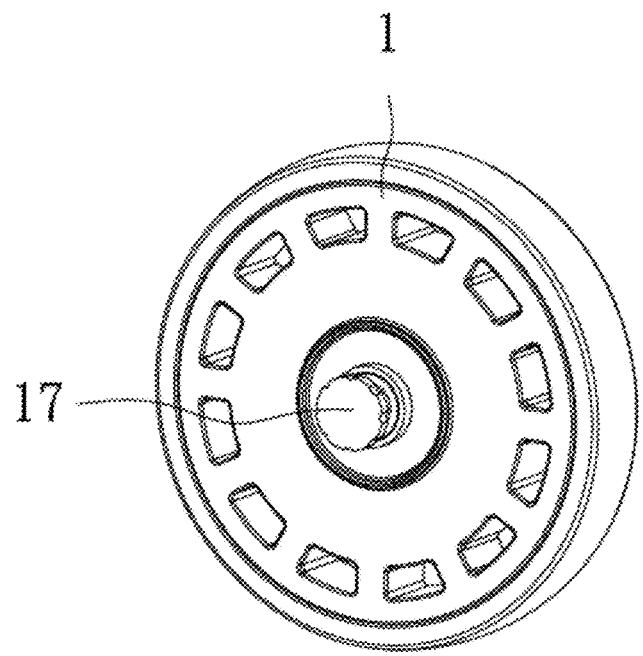
Figure 6:
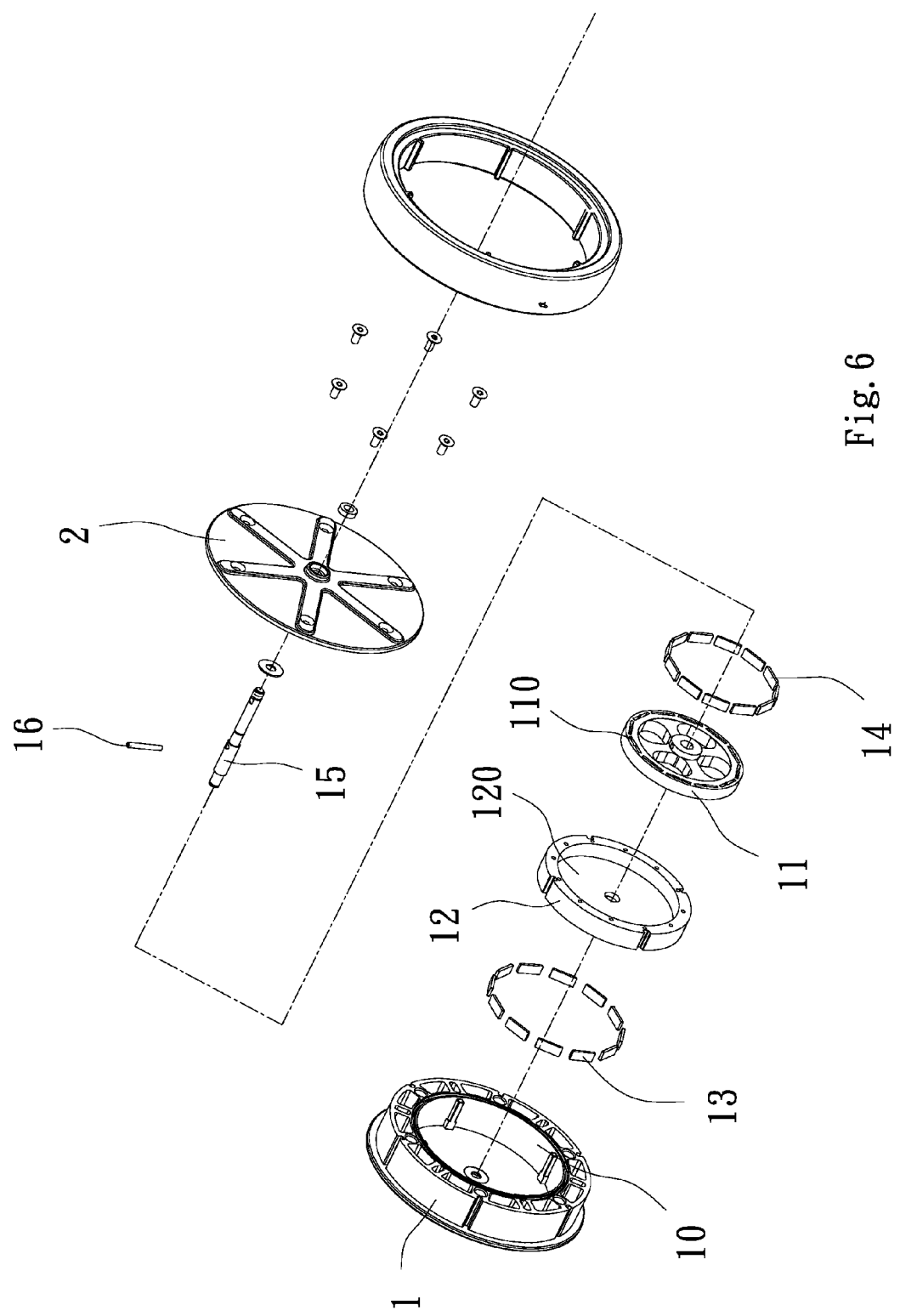
FIG. 6 is an exploded structural schematic view of the magnetic resistance mechanism of the present invention.
Figure 6A:
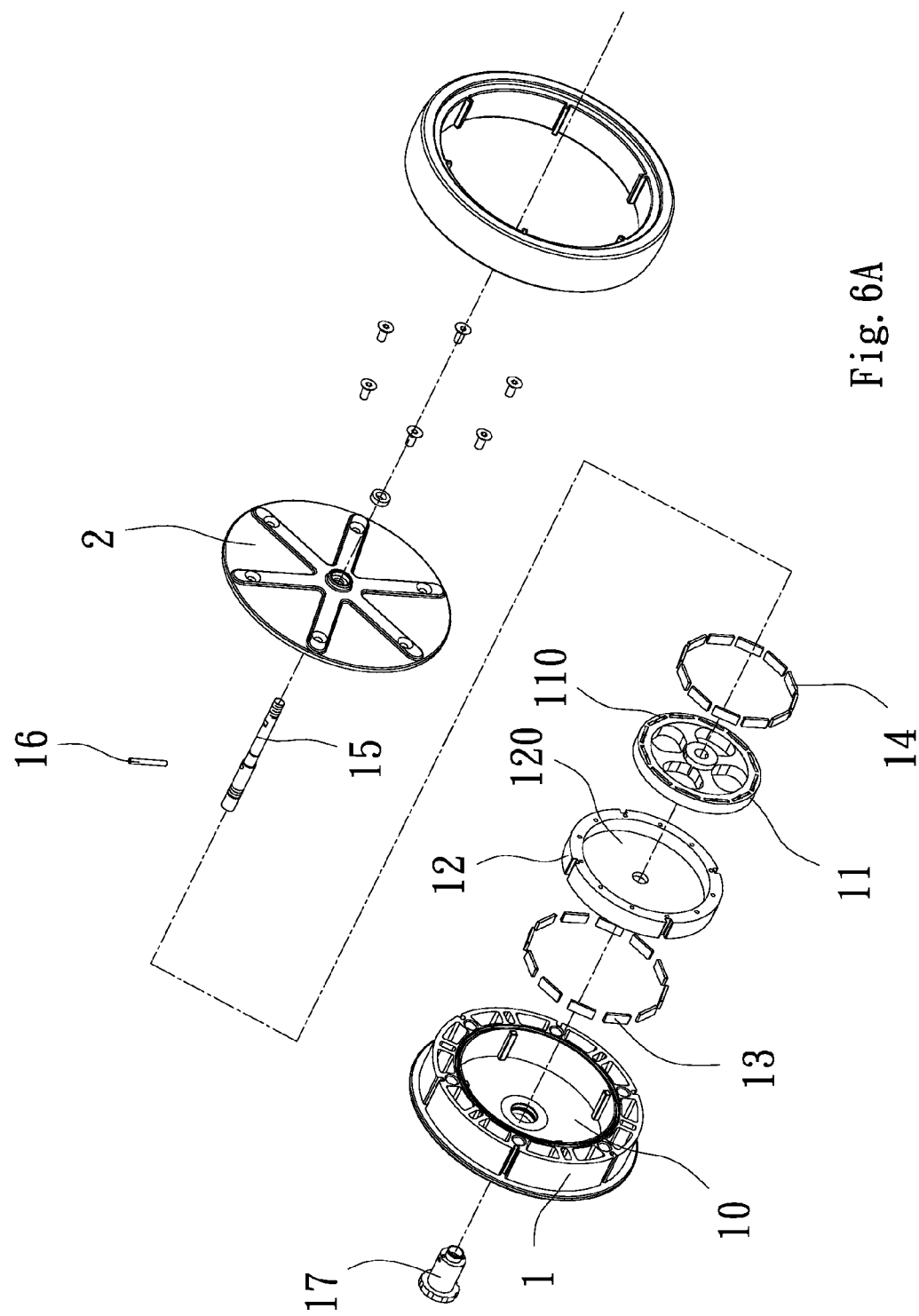
Figure 7:
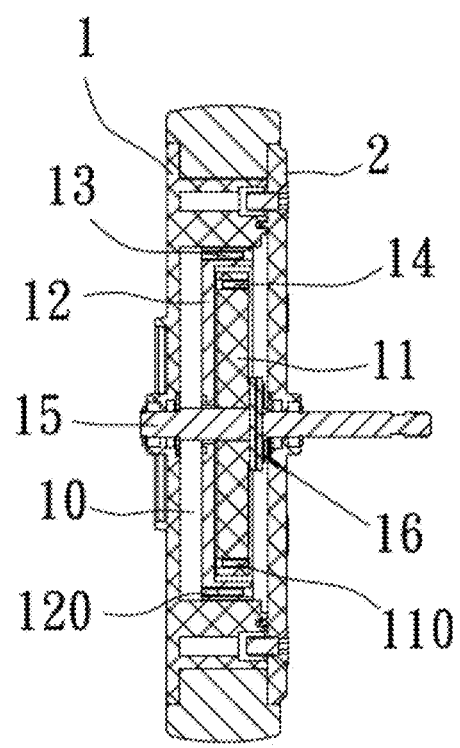
FIG. 7 is a cross-sectional structural schematic view of the magnetic resistance mechanism of the present invention.
Figure 7A:
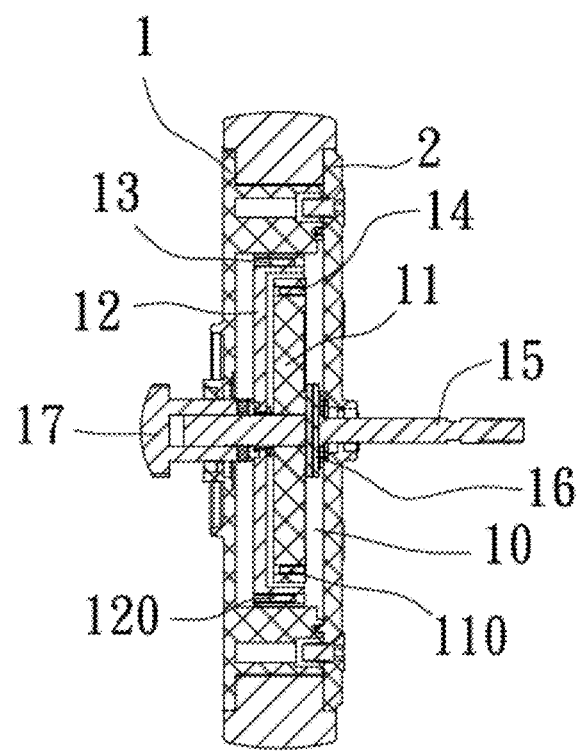

Referring to FIG. 5, FIG. 6, and FIG. 7, which show another type of the resistance force control structure of driven pulley device that uses a magnetic force as an alternative for damping oil, wherein the structure is still pivot mounted on a wheel of the driven pulley device, and primarily comprises the wheel housing 1 and the wheel outer cover 2. The holding space 10 is formed in the interior of the wheel housing 1, and the movable member 12, the fixing member 11, first magnetic elements 13, second magnetic elements 14, and the wheel shaft 15 are disposed in the holding space 10, wherein the first magnetic elements 13 and the second magnetic elements 14 are disposed on the movable member 12 and the fixing member 11 respectively. In addition, one end of the wheel shaft 15 penetrates the fixing member 11, and the fixing insert pin 16 is used to penetrate and rigidly fix the fixing member 11. The wheel housing 1 covers the wheel outer cover 2 to enable the holding space 10 to form a sealed space, and the wheel outer cover 2 enables the other end of wheel shaft 15 to penetrate therethrough. Furthermore, referring to FIG. 5-A, FIG. 6-A and FIG. 7-A, which show the adjustable mechanism 17 further added to the structure of the present invention. The adjustable mechanism 17 penetrates the movable member 12 and the wheel housing 1 and connects to the wheel shaft 15, wherein the adjustable mechanism 17 controls displacement of the movable member 12 within the holding space 10, thereby further achieving the effectiveness of controlling resistance. In the aforementioned embodiment, the wheel outer cover 2 needs to cover the outer side of the holding space 10 of the wheel housing 1 to enable sealing the holding space 10, the primary reason being to prevent the magnetic elements or the magnetic response objects from being affected by external factors, and causing serious deterioration thereof.

In the aforementioned embodiment, the first magnetic elements 13 are disposed within the movable member 12. The first magnetic elements 13 can be magnets or magnetic response objects, and the adjustable mechanism 17 is connected to form a rigid fixing with the wheel housing 1. Accordingly, the movable member 12 and the first magnetic elements 13 disposed therein are able to rotate together with the wheel housing 1. As for the fixing member 11 used to dispose the second magnetic elements 14 therein, the second magnetic elements 14 can be magnets or magnetic response objects, and the fixing member 11 is fixed to the wheel shaft 15, which is used to enable pin connection to a wheel of the driven pulley device.

Figure 8:
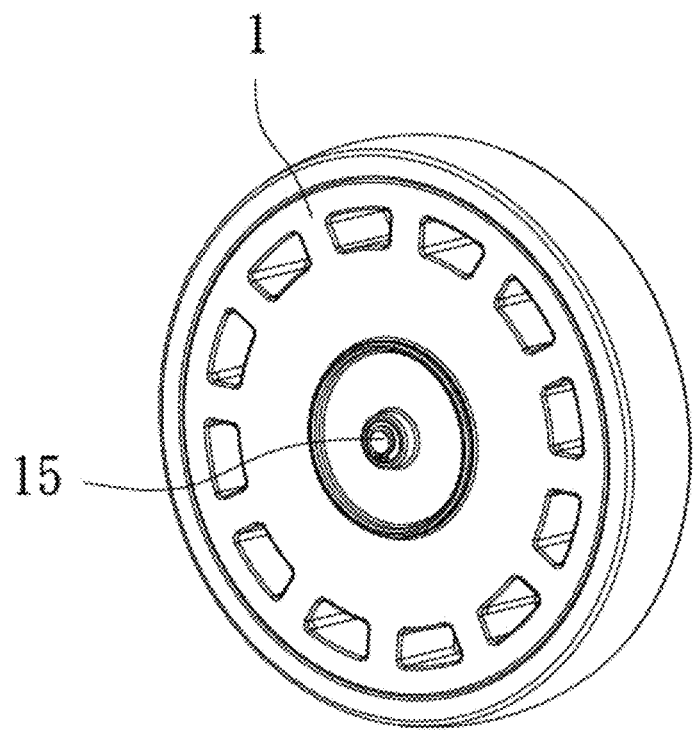
FIG. 8 is an elevational schematic view of a gear wheel magnetic resistance mechanism of the present invention.
Figure 8A:
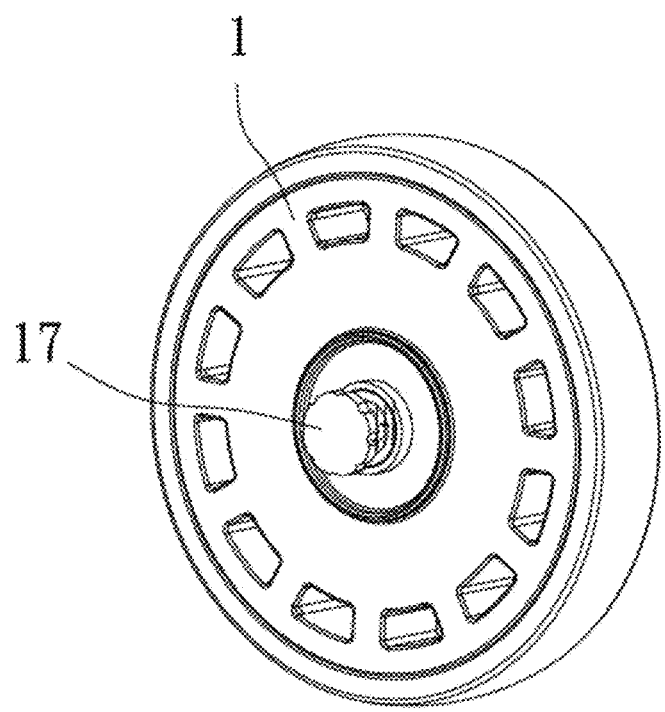
Figure 9:
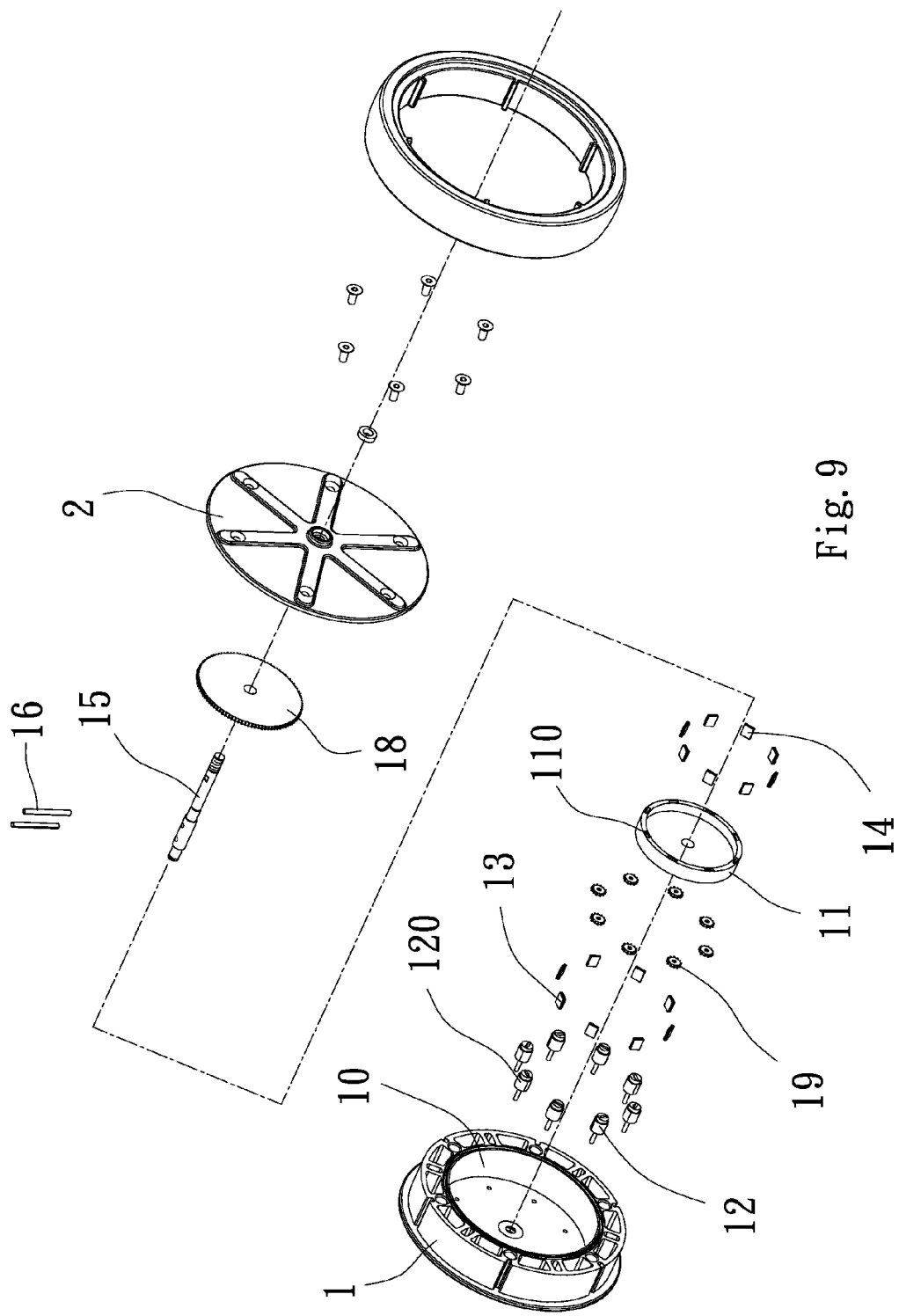
FIG. 9 is an exploded structural schematic view of the gear wheel magnetic resistance mechanism of the present invention.
Figure 9A:
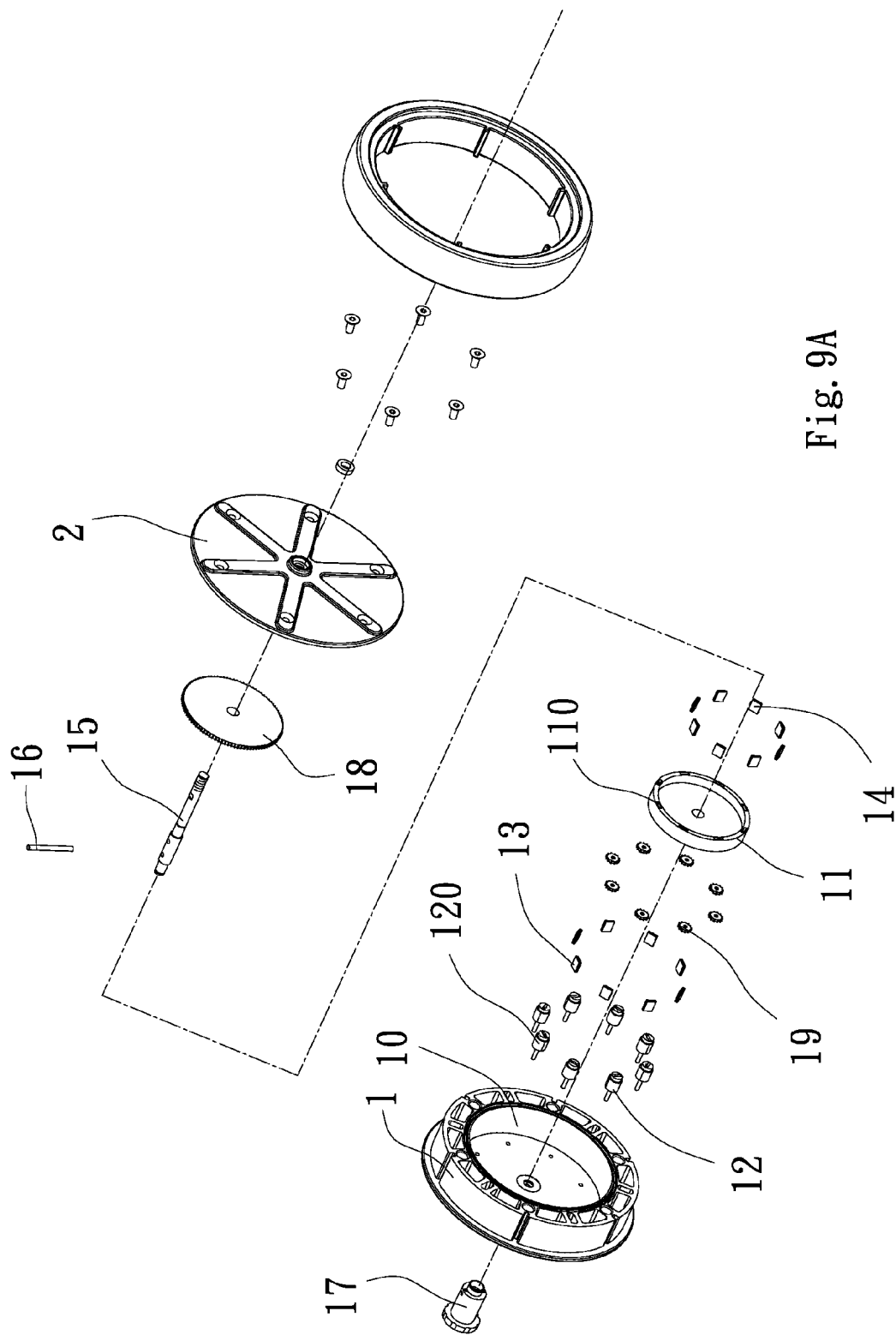
Figure 10:
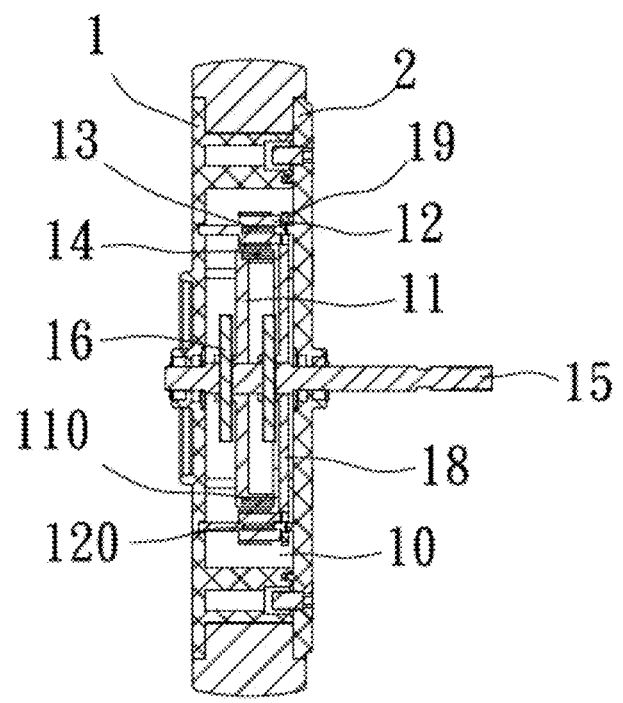
FIG. 10 is a cross-sectional structural schematic view of the gear wheel magnetic resistance mechanism of the present invention.
Figure 10A:
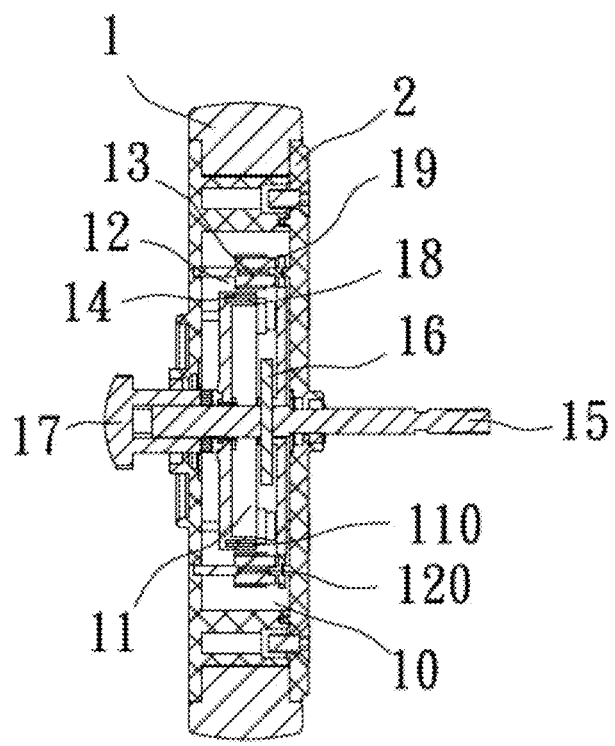

To provide the first magnetic elements 13 disposed within the movable member 12 with an autorotation function, change in magnetic force is used to increase the stabilizing effect of the wheeled frame. Referring to FIG. 8, FIG. 9, and FIG. 10, which show an elevational schematic view of another form of a magnetic resistance mechanism, an exploded structural schematic view of the magnetic resistance mechanism, and a cross-sectional structural schematic view of the magnetic resistance mechanism of the resistance control structure of driven pulley device of the present invention, respectively. The resistance force control structure of the present invention primarily comprises the wheel housing 1 and the wheel outer cover 2, wherein the holding space 10 is formed in the interior of the wheel housing 1. The movable member 12, the fixing member 11, the first magnetic elements 13, the second magnetic elements 14, and the wheel shaft 15 are disposed within the holding space 10, with the further addition of a big gear wheel 18 and small gear wheels 19 disposed therein. The first magnetic elements 13 and the second magnetic elements 14 are disposed on the movable member 12 and the fixing member 11 respectively. A holding space 120 is provided within the movable member 12. The axis center of the movable member 12 is connected to the axis center of the small gear wheels 19, and the small gear wheels 19 are pin connected to the big gear wheel 18, wherein the number of the small gear wheels 19 is one or more than one. The gear mechanism is able to assist in providing the first magnetic elements 13 within the movable member 12 with an autorotation function to achieve change in the magnetic force to increase the stabilizing effect of the wheeled frame. In addition, one end of the wheel shaft 15 penetrates the fixing member 11, and the fixing insert pin 16 is used to penetrate and rigidly fix the fixing member 11. The wheel housing 1 covers the wheel outer cover 2 to enable the holding space 10 to form a sealed space, and the wheel outer cover 2 enables the other end of the wheel shaft 15 to penetrate therethrough. Furthermore, referring to FIG. 8-A, FIG. 9-A, and FIG. 10-A, which show the adjustable mechanism 17 further added to the structure of the present invention. The adjustable mechanism 17 penetrates the fixing member 11 and the wheel housing 1 and connects to the wheel shaft 15, wherein the adjustable mechanism 17 controls displacement of the fixing member 11 within the holding space 10, thereby further achieving the effectiveness of controlling resistance. In the aforementioned embodiment, the wheel outer cover 2 needs to cover the outer side of the holding space 10 of the wheel housing 1 to enable sealing the holding space 10, the primary reason being to prevent the magnetic elements or a magnetic response objects from being affected by external factors, and causing serious deterioration thereof.

In the aforementioned embodiment, the first magnetic elements 13 are disposed within the movable member 12. The first magnetic elements 13 can be magnets or magnetic response objects, and are mutually connected to the movable member 12. Accordingly, the movable member 12 and the first magnetic elements 13 disposed therein are able to rotate together with the wheel housing 1. The fixing member 11 is used to dispose the second magnetic elements 14, and the second magnetic elements 14 can be magnets or magnetic response objects. The fixing member 11 is interconnected to the wheel shaft 15, and the adjustable mechanism 17 is connected to the wheel housing 1, thereby enabling inter-pin connection to a wheel of the driven pulley device.

The movable member 12 is provided with one or more than one of the holding spaces 120 in the interior thereof to dispose the first magnetic elements 13, wherein the first magnetic elements 13 are magnets or magnetic response objects, and the number thereof can be one or more than one.

The fixing member 11 is provided with one or more than one holding space 110 in the interior thereof to dispose the second magnetic elements 14, wherein the second magnetic elements 14 are magnets or magnetic response objects, and the number thereof can be one or more than one.

Furthermore, the movable member 12 or the fixing member 11 is connected to the wheel shaft 15 through the adjustable mechanism 17, and adjustment of the adjustable mechanism 17 is used to control displacement of the movable member 12 or the fixing member 11 within the holding space 10. The first magnetic elements 13 and the second magnetic elements 14 can be magnets or magnetic response objects disposed inside the movable member 12 and the fixing member 11 respectively, and to enable achieving control of the first magnetic elements 13 or the second magnetic elements 14 within the interior of the movable member 12 or the fixing member 11 respectively, the reaction area and distance between the movable member 12 and the fixing member 11 is varied to enable changing the magnetic force strength therebetween to achieve controlling the rotational resistance of the wheel set. At the same time, the mutually generated magnetic force between the first magnetic elements 13 and the second magnetic elements 14 is used to achieve controlling the forward speed of the wheel.

When the wheel moves forward, the magnets or magnetic response objects within the fixing member 11 and the magnetic response objects or magnets within the movable member 12 generate a magnetic force, which limits the wheel speed to achieve the effectiveness to restrict the forward speed of the wheel. The user can control the magnets or magnetic response objects within the movable member 12 or the fixing member 11 through the adjustable mechanism 17 on the wheel housing 1 to change the magnetic force area or distance or contact between the magnetic response objects or magnets of the movable member 12 and the fixing member 11, thereby further controlling the magnitude of the magnetic force to achieve the effectiveness of controlling resistance.

In the aforementioned embodiment, the movable member 12 and the fixing member 11 can be configured using the following three configurations. Configuration 1: Dispose magnets within the movable member 12 and dispose magnets within the fixing member 11. Configuration 2: Dispose magnetic response objects within the movable member 12 and dispose magnets within the fixing member 11. Configuration 3: Dispose magnets within the movable member 12 and dispose magnetic response objects within the fixing member 11. The aforementioned various configurations can equally achieve the objects of the present invention to use the mutually generated resistance between the magnetic forces to achieve controlling the forward speed of the wheel, and varying the magnetic force strength between the movable member 12 and the fixing member 11 to achieve controlling the rotational resistance of the wheel set.

As described in the aforementioned configuration 1, when magnets are disposed both within the fixing member 11 and within the movable member 12, and, as depicted in FIG. 8-A, FIG. 9-A, and FIG. 10-A, the big gear wheel 18 and small gear wheels 19 are disposed in the holding space 10 of the wheel housing 1 and are connected to the first magnetic elements 13 within the movable member 12, then the second magnetic elements 14 on the fixing member 11 are able to produce change in the magnetic force. Accordingly, the adjustable mechanism 17 is able to effect displacement of the fixing member 11 within the holding space 10.

It is worth mentioning that in the damping oil mechanism, the damping oil 20 can be replaced by the first magnetic elements 13 and the second magnetic elements 14 to enable the adjustable mechanism 17 to adjust the movable member 12 or the fixing member 11 and further control the influencing area between the two members to achieve the effectiveness of controlling resistance. Regarding the structures of the movable member 12, the fixing member 11, the first magnetic elements 13, and the second magnetic elements 14, referring to FIG. 5, FIG. 6, and FIG. 7, which show an elevational schematic view of the magnetic resistance mechanism, an exploded structural schematic view of the magnetic resistance mechanism, and a cross-sectional structural schematic view of the magnetic resistance mechanism of the resistance control mechanism of the driven pulley device of the present invention, respectively.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A resistance force control structure of driven pulley device, which is pivot mounted on a wheel of a driven pulley device, comprising:

a wheel housing, a holding space is formed within the wheel housing, and a fixing member, a movable member, damping oil, and a wheel shaft are installed within the holding space; the fixing member and the movable member are respectively disposed within the holding space of the wheel housing, wherein one end of the wheel shaft penetrates the fixing member, and a fixing insert pin is used to penetrate and rigidly fix the fixing member;

a wheel outer cover, the wheel outer cover is disposed on the wheel housing, and covers the holding space to form a sealed space, an interior of the sealed space is filled with the damping oil, wherein the wheel outer cover enables another end of the wheel shaft to penetrate therethrough;

a ventilation structure, the ventilation structure is disposed on an outer side of the wheel housing or an outer side of the wheel outer cover to enable entering and expelling of air in the sealed space.

2. The resistance force control structure of driven pulley device according to claim 1, wherein an adjustable mechanism is further added to the structure, the adjustable mechanism penetrates the movable member and the wheel housing and connects to the wheel shaft, wherein the adjustable mechanism controls displacement of the movable member within the holding space to adjust a height of the damping oil level.

3. A resistance force control structure of driven pulley device, which is pivot mounted on a wheel of a driven pulley device, comprising:

a wheel housing, a holding space is formed within the wheel housing, and a movable member, a fixing member, at least one first magnetic element, at least one second magnetic element, and a wheel shaft are installed within the holding space, wherein the first magnetic elements and the second magnetic elements are disposed on the movable member and the fixing member respectively, one end of the wheel shaft penetrates the fixing member, and a fixing insert pin is used to penetrate and fix the fixing member;

a wheel outer cover, the wheel outer cover is disposed on the wheel housing and covers the holding space to form a sealed space, wherein the wheel outer cover enables another end of the wheel shaft to penetrate therethrough.

4. The resistance force control structure of driven pulley device according to claim 3, wherein an adjustable mechanism is further added to the structure, the adjustable mechanism penetrates the movable member and the wheel housing and connects to the wheel shaft, wherein the adjustable mechanism controls displacement of the movable member within the holding space to adjust an effective distance and area between the two magnetic elements.

5. The resistance force control structure of driven pulley device according to claim 3, wherein the first magnetic elements are magnets or magnetic response objects.

6. The resistance force control structure of driven pulley device according to claim 3, wherein the second magnetic elements are magnets or magnetic response objects.

7. A resistance force control structure of driven pulley device, which is pivot mounted on a wheel of a driven pulley device, comprising:

a wheel housing, a holding space is formed within the wheel housing, and a movable member, a fixing member, at least one first magnetic element, at least one second magnetic element, at least one small gear wheel, a big gear wheel, and a wheel shaft are installed within the holding space, wherein the first magnetic elements and the second magnetic elements are disposed on the movable member and the fixing member respectively; the first magnetic elements are disposed within the movable member, and the movable member extends to the small gear wheels, wherein the big gear wheel is fixedly connected to the wheel shaft and moves relative to the wheel, the small gear wheels mutually connect with the big gear wheel, one end of the wheel shaft penetrates the fixing member, and a fixing insert pin is used to penetrate and fix the fixing member, wherein the big gear wheel and the small gear wheels are disposed within the holding space;

a wheel outer cover, the wheel outer cover is disposed on the wheel housing and covers the holding space to form a sealed space, wherein the wheel outer cover enables another end of the wheel shaft to penetrate therethrough.

8. The resistance force control structure of driven pulley device according to claim 7, wherein an adjustable mechanism is further added to the structure, the adjustable mechanism penetrates the fixing member and the wheel housing and connects to the wheel shaft, wherein the adjustable mechanism controls displacement of the fixing member within the holding space to adjust an effective distance and area between the two magnetic elements.

* * * * *